US008305979B2

(12) United States Patent
Manning et al.

(10) Patent No.: US 8,305,979 B2
(45) Date of Patent: Nov. 6, 2012

(54) MANAGING MULTIPLE APPLICATION FLOWS OVER AN ACCESS BEARER IN A QUALITY OF SERVICE POLICY ENVIRONMENT

(75) Inventors: Serge M. Manning, Overland Park, KS (US); Roy L. Spitzer, Rockville, MD (US)

(73) Assignee: Clearwire IP Holdings LLC, Bellevue, WA (US)

( * ) Notice: Subject to any disclaimer, the term of this patent is extended or adjusted under 35 U.S.C. 154(b) by 518 days.

(21) Appl. No.: 12/554,503

(22) Filed: Sep. 4, 2009

(65) Prior Publication Data

US 2011/0058523 A1      Mar. 10, 2011

(51) Int. Cl.
*H04W 4/00* (2009.01)
(52) U.S. Cl. .................................. 370/329; 370/341
(58) Field of Classification Search .................. None
See application file for complete search history.

(56) References Cited

U.S. PATENT DOCUMENTS

| | | | | |
|---|---|---|---|---|
| 2002/0141398 | A1* | 10/2002 | Qiao et al. | 370/360 |
| 2004/0202156 | A1* | 10/2004 | Fonden et al. | 370/389 |
| 2005/0101245 | A1* | 5/2005 | Ahmavaara | 455/1 |
| 2007/0237134 | A1* | 10/2007 | Bergenlid et al. | 370/352 |
| 2008/0123660 | A1* | 5/2008 | Sammour et al. | 370/395.21 |
| 2008/0273520 | A1* | 11/2008 | Kim et al. | 370/345 |
| 2008/0310334 | A1* | 12/2008 | Nakamura et al. | 370/310 |
| 2010/0217855 | A1* | 8/2010 | Przybysz et al. | 709/223 |
| 2011/0035495 | A1* | 2/2011 | Ekstrom et al. | 709/225 |
| 2011/0122886 | A1* | 5/2011 | Willars et al. | 370/412 |

OTHER PUBLICATIONS

"3rd Generation Partnership Project; Technical Specification Group Core Network and Terminals; Policy and Charging Control over Gx reference point," 3GPP TS 29.212 V8.0.0. (May 2008).
"3rd Generation Partnership Project; Technical Specification Group Services and System Aspects; Policy and Charging Control Architecture (Release 8), "# 3GPP TS 23.203 V8.1.1 (Mar. 2008).
"3rd Generation Partnership Project; Technical Specification Group Core Network and Terminals; Policy and Charging Control over Rx reference point (Release 8), "#3GPP TS 29.214 V8.0.0 (Mar. 2008).
"Bandwidth on Demand Application Manager—User's Guide", DOC-0005, Rev. E., Camiant, Inc., 2007.

* cited by examiner

*Primary Examiner* — Chi Pham
*Assistant Examiner* — Soon-Dong D Hyun
(74) *Attorney, Agent, or Firm* — Winston & Strawn LLP

(57) ABSTRACT

A method, system and software to dynamically allocate bandwidth on an application flow basis in a non-Internet-Protocol Multimedia Subsystem (non-IMS) environment is described. The method includes: receiving a request to create an application flow for an Internet Protocol (IP) filter with desired Quality of Service (QoS) properties; searching for an access bearer that is comparable to the desired QoS properties; when a comparable access bearer is not found, creating the access bearer adapted to support the IP filter and the desired QoS properties; and associating the application flow with the access bearer. According to various embodiments, a method to add a new application flow from a flow bandwidth manager to a Policy Control and Charging Rules Function (PCRF) is also described The method can include: searching for an access bearer that supports an IP filter and desired QoS properties; when there is an existing access bearer, mapping the new application flow to the access bearer and modifying the properties of the existing access bearer to support the new application flow. and creating a new access bearer when there is no existing access bearer.

39 Claims, 4 Drawing Sheets

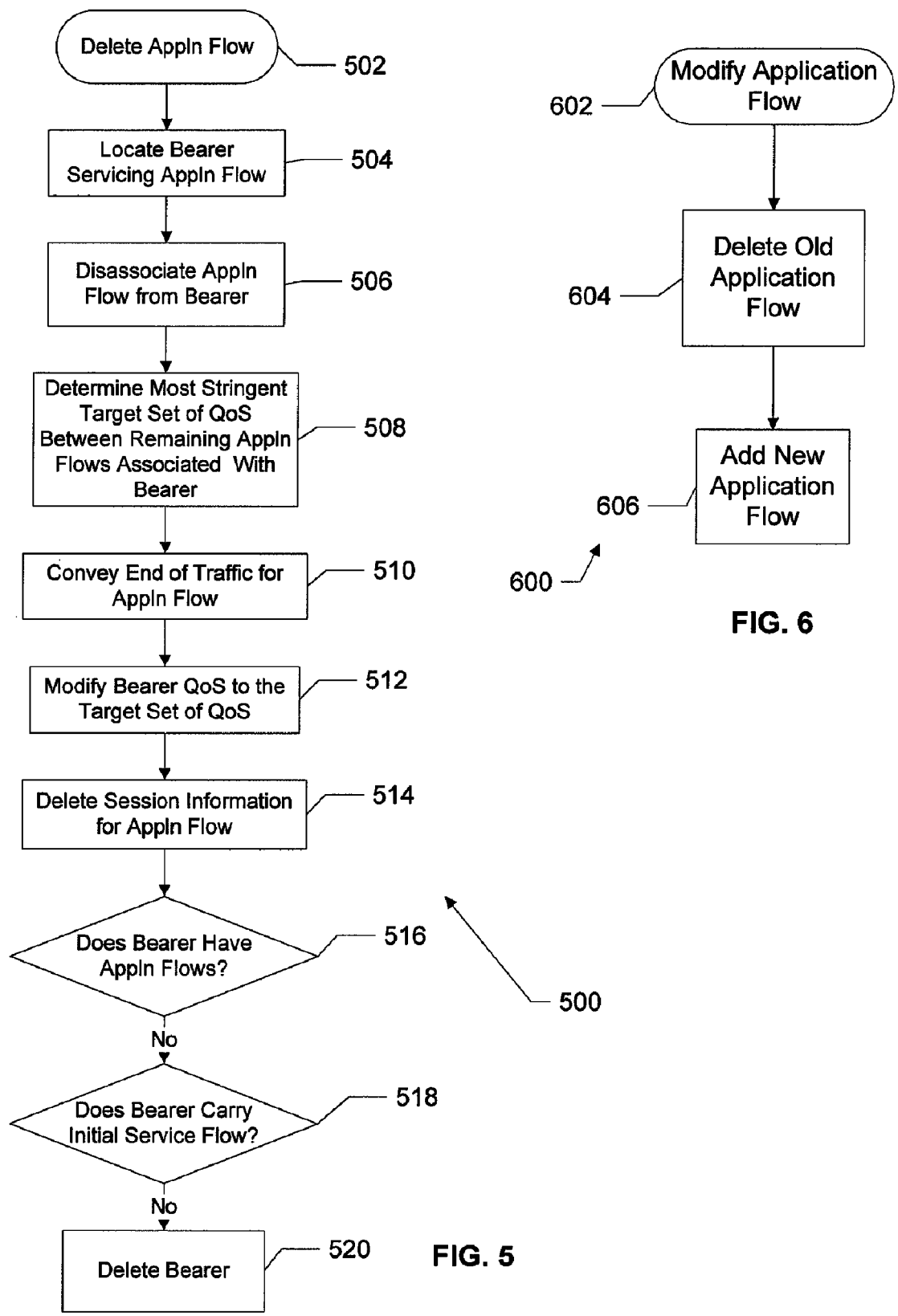

MANAGING MULTIPLE APPLICATION FLOWS OVER AN ACCESS BEARER IN A QUALITY OF SERVICE POLICY ENVIRONMENT

TECHNICAL FIELD

The teachings relate to dynamic Quality of Service (QoS) management in a policy management environment. The teachings also relate to supporting one-to-one, many-to-one, one-to-many, and many-to-many associations between application flows and QoS flows.

BACKGROUND

Policy Control and Charging (PCC) encompasses systems that manage a QoS policy for an enterprise. A QoS policy manager can be static or dynamic. Some standardized policy managers for managing and enforcing QoS policies for an enterprise are compliant with a 3GPP standard that provides a way for the access network to grant QoS to a Mobile Station (MS) based on policy rules. The association mechanism for a one-to-one access bearer and application association has been thoroughly documented in the WiMAX Forum and 3GPP standards. In these cases the application requests are tied directly into the access bearer QoS allocation. The current 3GPP PCC technical specifications are:

"3rd Generation Partnership Project; Technical Specification Group Core Network and Terminals; Policy and Charging Control over Gx reference point," 3GPP TS 29.212 V8.0.0 (2008-05);

"3rd Generation Partnership Project; Technical Specification Group Services and System Aspects; Policy and charging control architecture (Release 8)," 3GPP TS 23.203 V8.1.1 (2008-03); and "3rd Generation Partnership Project; Technical Specification Group Core Network and Terminals; Policy and Charging Control over Rx reference point (Release 8)," 3GPP TS 29.214 V8.0.0 (2008-03), all of which are incorporated herein in their entirety by reference. PCC allows QoS requests to be correlated to application QoS requirements so that applications can help authorize QoS requests based on policy. An Application Function (AF) communicates with a Policy Control and Charging Rules Function (PCRF) that makes policy decisions. These policy decisions are then communicated to the Policy and Charging Enforcement Function (PCEF) which usually resides in the access gateway. The PCEF carries out policy decision by creating and controlling access bearers. In WiMAX networks, the PCEF resides in the ASN-GW.

In this document, "access bearer" comports with the PCC definition of "IP-CAN bearer," for example, as noted on page 7 of 3GPP TS 29.212 V8.0.0 (2008-05) identified above. "Application flows" in this document comports with the PCC definition of "IP flows based on AF Service Information" for example, as noted on page 7 of 3GPP TS 29.212 V8.0.0 (2008-05) identified above.

Radio Area Network (RAN) vendors can use a bandwidth manager as a central point in the network to submit QoS requests for services that do not have a dedicated AF using PCC interfaces. For instance, the Camiant BoD Manager 3.1 described in "Bandwidth on Demand Application Manager User's Guide," Doc-00005, Revision E, and which is available from Camiant, Inc. of Marlborough, Mass. Camiant BoD Manager 3.1 provides such a bandwidth manager. A bandwidth manager can serve as a sort of surrogate or substitute AF that submits application flow requests to the PCRF to get access bearers established on behalf of certain services. Further, a bandwidth manager submits a QoS flow request on behalf of an application flow request to provide an access bearer with the appropriate QoS properties. In some embodiments, the bandwidth manager supports standardized Hyper Text Transfer Protocol (HTTP) and Simple Object Access Protocol (SOAP) based interfaces to web servers and third party application servers. In other embodiments, non-standardized interfaces can be provided to web servers and third party application servers in order to support QoS functions. For instance, an end user can click on an accelerator button on a web portal to get increased bandwidth for general web traffic via the bandwidth manager.

In some embodiments, the PCC definition is used to manage QoS flows over access bearers. A wireless RAN vendor, for instance, WiMAX, only supports a limited number of access bearers per MS interface or wireless gateway. There is a need to support dynamic service flow allocation based on the PCC definition in WiMAX Forum NWG version 1.5. Currently the WiMAX Forum only specifies methods for a single application session to be mapped to a single WiMAX Service Flow. Current products only have a one-to-one association between application flow and access bearer. Current standards only associate an access bearer with one application flow.

SUMMARY

According to various embodiments, a method to dynamically allocate bandwidth for a non-Internet-Protocol Multimedia Subsystem (non-IMS) application flow is described. In some embodiments, while the applications are non-IMS, the remainder of the network can be IMS compliant. As such, the teachings herein can be used in a hybrid IMS and non-IMS network. The method comprises: receiving a request to create an application flow for an Internet Protocol (IP) filter with desired QoS properties; searching for an access bearer that is comparable to the desired QoS properties; when a comparable access bearer is not found, creating the access bearer adapted to support the IP filter and the desired QoS properties; and associating the application flow with the access bearer. The found access bearer can be further limited to match the IP filter. According to various embodiments, the method can comprise determining a target set of QoS properties by selecting a more stringent QoS property between a QoS property of the access bearer and a QoS property of the desired QoS properties; and modifying the QoS properties of the associated access bearer to match the target set of QoS properties. Determining of the target set can comprise comparing the desired QoS properties to the QoS properties of application flows previously associated with the associated access bearer. According to various embodiments, the method can comprise receiving a request to delete an application flow; locating the access bearer associated with the application flow; and disassociating the application flow from the access bearer. The method can also comprise: determining a target set of QoS properties by selecting a more stringent QoS property from the QoS properties of the application flows still associated with the disassociated access bearer; and modifying the QoS properties of the disassociated access bearer to match the target set of QoS properties. The method can comprise conveying an indication of when traffic for the application flow ends. According to various embodiments, the method can comprise deleting the disassociated access bearer when the disassociated access bearer has no application flows associated with it. The receiving can comprise receiving the request from a network side device. According to various embodiments, the method can further comprise: receiving a request to amend an application flow to use amended QoS properties; deleting the old application flow; and creating an application flow with the amended QoS properties. The method can further comprise adjusting the desired QoS properties to be less than or equal to a system maximum set of QoS properties. The method can comprise storing an association table comprising the desired QoS properties and the associated access bearer for an application flow. The IP filter can be stored in the association table. According to various embodiments, method can further comprise selecting an access bearer that need not be modified to accommodate the desired QoS properties before selecting an access bearer that needs to be modified to accommodate the desired QoS properties.

According to various embodiments, a system to dynamically allocate bandwidth for a non-IMS application flow is described. The system comprises: a request receiver to create an application flow for an IP filter with desired QoS properties; a search access bearer primitive adapted to select an access bearer that provides comparable QoS properties; a create access bearer primitive adapted to create an access bearer adapted to support the IP filter and the desired QoS properties; and a storage adapted to store the association between the application flow; and the found or created access bearer. The found access bearer can be further limited to match the IP filter. The system can comprise a target QoS set builder adapted to select a more stringent QoS property between a QoS property of the associated access bearer and a QoS property of the desired QoS properties; and an update access bearer primitive to modify the QoS properties of the associated access bearer to match the target QoS property set. The QoS set builder can build the target QoS property set by comparing the desired QoS properties to the QoS properties of application flows previously associated with the associated access bearer. The system can receive a request to delete an application flow. In some embodiments, the system can comprise an application flow delete primitive to locate the access bearer associated with the application flow; and to disassociate the application flow from the access bearer. The system can delete the access bearer if no application flows remain associated with the access bearer. The system can also comprise a target QoS set builder adapted to select a more stringent QoS property from the QoS properties of the application flows still associated with the disassociated access bearer, and an update access bearer primitive to modify the QoS properties of the disassociated access bearer to match the target set of QoS properties. The search access bearer primitive can select an access bearer that need not be modified to accommodate the desired QoS properties before selecting an access bearer that needs to be modified to accommodate the desired QoS properties.

According to various embodiments, a computer readable medium in which software is recorded, wherein the software is configured to implement a method to dynamically allocate bandwidth on a non-IMS application flow basis is described.

According to various embodiments, a method to add a new application flow from a flow bandwidth manager to a PCRF is described. The method can comprise: searching for an access bearer that supports an IP filter and desired QoS properties; when there is an existing access bearer, mapping the new application flow to the access bearer and modifying the properties of the existing access bearer to support the new application flow; and creating a new access bearer when there is no existing access bearer. The method can further comprise managing the access bearers using a PCRF. The PCRF can control an Access Service Network (ASN) gateway. The PCRF can be implemented in a WiMAX network. The PCRF can manage access bearers on a wireless gateway.

BRIEF DESCRIPTION OF THE DRAWINGS

The same reference number represents the same element on all drawings. It should be noted that the drawings are not necessarily to scale. The foregoing and other objects, aspects, and advantages are better understood from the following detailed description of a preferred embodiment of the invention with reference to the drawings, in which:

FIG. 5 is an embodiment of a method to delete an application flow; and

FIG. 6 is an embodiment of a method to modify an application flow with a desired QoS.

DETAILED DESCRIPTION

Figure 1:
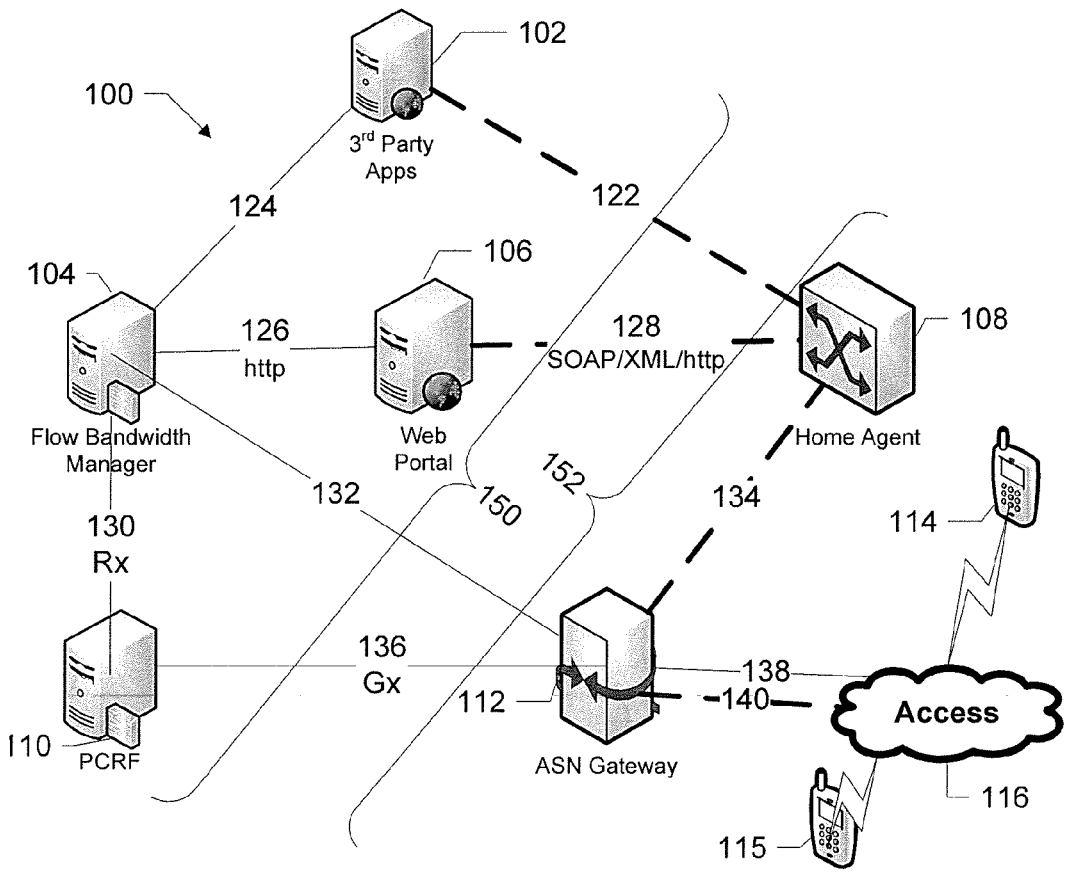
FIG. 1 is an embodiment of a high level diagram of a system with a flow bandwidth manager in its network.

The teachings relate to a method for supporting the dynamic allocation of bandwidth on a service flow basis in a non-IMS environment. The method supports handling multiple application flows mapped to a single service flow in non-IMS environments to better utilize the service flow is also described. The teachings can be used to manage bandwidth utilization to control network capital expenditures. The teachings can also be used to support premium, revenue-generating IP-based services. A process to provide dynamic modification to the QoS allocation and bandwidth on demand access manager in a PCRF architecture is also described. In some embodiments, while the applications are non-IMS, the remainder of the network can be IMS compliant. As such, the teachings herein can be used in a hybrid IMS and non-IMS network.

The teachings herein provide better utilization of service flows. The teachings also provide efficient sharing of a single service flow for multiple application flows on the same device. Application flows can be initiated from one or more applications. The ability to provide multiple application flows over the same access bearer can optimize bandwidth utilization efficiency. Multiple application flows over the same access bearer can also conserve valuable resources on a network element, such as, a wireless gateway network element or an ASN gateway. The same mechanism can support a one application flow to one access bearer relationship, and a plurality of application flows to one access bearer relationship. One-to-one application flow to access bearer relationship and many-to-one application flows to access bearer relationships can be treated identically. In other embodiments, indication of when traffic for an application flow starts is explicitly conveyed. For some embodiments, indication of when traffic for an application flow ends is explicitly conveyed. Similar signaling and control can be present for both MS initiated and network initiated access bearers. In some embodiments, only the network initiated application flows can share an access bearer to a MS. In some embodiments, there is no impact to specialized expensive network components, such as, the Access Gateway and PCRF. A single application can use several distinct application flows that have different QoS needs. For example, a single application can require application flows for audio, video, control, or subcomponents of each. As such, a web-site or a third party can initiate multiple application flows to one MS, and one or more of the multiple application flows can utilize the same access bearer in the present teachings.

Some wireless RAN vendors, for example, WiMAX, only supports a limited number of access bearers per MS interface or wireless gateway. They do not support mapping multiple application flows to a single access bearer. The present teachings: (1) optimize bandwidth utilization efficiency by multiplexing several application flows over the same access bearer; (2) conserve valuable resources on the wireless gateway network elements; (3) do not require access bearer creation/deletion for each application flow that is started/stopped; and (4) support an access bearer that behave as Initial Service Flows (ISF). ISFs have a permanently assigned application flow for ISF functionality. The flow manager can provide access point accounting and capacity monitoring of application flows for a RAN and/or a carrier-to-user usage. The accounting and capacity monitoring can collect data, for example, by application flow, by access bearer, or by user. In some embodiments, the accounting and capacity monitoring can record the tearing-down of an access bearer for capacity planning and operational needs.

An application flow can comprise an IP flow defined by one or more IP filters. An IP filter comprises a tuple. The tuple can comprise, for example, an IP 5-tuple, a destination IP address, a MS IP address or the like. The IP 5-tuple comprises an IP source address, a source port, a destination IP address, a destination port, and a protocol ID. In some embodiments, the IP filter can differentiate between a network-side or network-initiated application flow and MS-side or MS-initiated application flow. For example, the differentiation between application flows initiated by the network-side and MS side can be established by placing MS-side devices in a sub-network identifiable by a network mask or maintaining a list of addresses assigned to MS devices. The IP filter can comprise one or more of a network IP address, a network port, a MS IP address, a MS port or a protocol ID. The IP flow identified by the IP filter carries signaling and/or media traffic that has a common QoS treatment. Media traffic, e.g., audio, video, low latency data, high bandwidth data, or subcomponents of the same, often require specific QoS treatments. Typically, an application can have multiple application flows that each carries individual media components.

An access bearer or bearer can comprise a transport connection from the MS into the access network including an air interface that meets a single QoS treatment. In one embodiment, best effort is considered a QoS treatment. For example, in the WiMAX access network, a unidirectional service flow (uplink or downlink) or a set of two service flows (one uplink, one downlink) constitutes an access bearer.

These teachings extend a bandwidth manager known in the art by allowing multiple application flows to share the same access bearer. The application flow association to an access bearer optimizes the conservation of access bearers. Conservation of access bearers leverages current vendor implementations. Ordinarily, when an additional application flow is created, the bandwidth manager communicates with PCRF to create an additional access bearer to support the application flow. However, when an access bearer possesses sufficient QoS properties to support an additional application flow, it is unnecessary to create an additional access bearer. The existing access bearer can be modified to carry the additional application flow when possible. This conserves access bearers reducing the number of simultaneous access bearers a terminal (and network) need to support. Also it eliminates the over the air signaling necessary to establish and teardown an additional access bearer as well as the transport overhead of additional access bearers. This can significantly reduce the load on network elements for short-lived connections that usually do not require large bandwidths. Examples of short-lived connections can include instant messages, web-pages, images for web-pages, etc. The teachings can also optimize bandwidth utilization efficiency by multiplexing several application sessions flows over the same access bearer. For example, one access bearer can support all the application flows associated with a web-page download including its images.

The teachings further provide mechanisms to add and delete application flows that cause the Flow Bandwidth Manager (FBM) to communicate to a PCRF in such a way that the PCRF:

Creates or deletes a new access bearer,

Maps the new application flow to an existing access bearer or removes an application flow from an existing access bearer, or Modifies the properties of an existing access bearer to support adding a new application flow or the removal of an application flow.

The FBM also can provide accounting records on behalf of web servers and third party application servers for each application flow that it manages. Application functions have typically provided their own mechanisms for user authentication and accounting. Each application function uses a proprietary non-integrated method for authentication and accounting. These teachings allow the network to leverage a single method to proxy authentication and accounting into a synchronized database view.

FIG. 1 illustrates an example system or network 100 based on a FBM 104. In some embodiments, a MS device 114 or 115 on an access network 116 can communicate directly to with FBM 104. In some embodiments, a Web Portal 106 or third party application 102 can communicate directly to with FBM 104. Control messages sent to flow bandwidth manager 104 can be sent over a generalized interface or over a special dedicated interface, such as interface 124, 126, or 132. FBM 104 can communicate with ASN Gateway using interface 132. A PCRF 110 can control an ASN Gateway 112 using a Gx interface 136. Messages regarding application flow startup or application flow end can be conveyed using Rx interface 130 by FBM 104 to PCRF 110. FBM 104 can send control messages to PCRF 110 over a generalized interface or over a special dedicated interface such as 130. Data can be communicated to MS device 114 or 115 using one or more of interfaces 122, 128, 134, and 140. Data can be communicated to device 114 from a third party application server 102 or a web portal server 106 through a home agent 108. Home agent 108 can provide an IP-tunnel or a Virtual Private Network (VPN) to communicate between MS device 114 or 115 on a mobile-side 152, and a server (e.g., third party application server 102 or a web portal server 106) on a network-side 150. Home agent 108 can communicate with an ASN gateway 112 over interface 134 to communicate with MS device 114 or 115. In some embodiments home agent 108 can be eliminated. In some embodiments home agent 108 can be subsumed into ASN gateway 112. MS device 114 or 115 can be controlled using interface 138 via access network 116. Mobile-side 152 comprises network infrastructure including network devices, which is used to provide IP connection management, e.g., addressing, connectivity, mobility, etc., for MS device 114 or 115. Network-side 150 is everything else and comprises for example the Internet. The various interfaces can be provided by multiplexing communications over one physical link. In some embodiments, the interfaces can be provided by dedicated physical links. The control information can share a physical link with the data. In other embodiments, the control information link is physically separate from the data link. In some embodiments, the separation between data and control can be provided using virtual private networks or the like.

The FBM relies on network protocols such as HTTP or SOAP over XML as a signaling mechanism to manage application flow allocation and parameterization. The FBM manages application flow establishment, teardown and modification. The Flow FBM relies on a pre-existing access bearer whenever possible.

A non-SIP based Flow Bandwidth Manager Server can use HTTP or SOAP/XML to establish Application Flows between the Home Agent and MS or between the Home Agent and the Application Server. HTTP and SOAP/XML parameters provide the negotiated Bandwidth and Protocol Parameters for each associated Application Flow.

Figure 2:
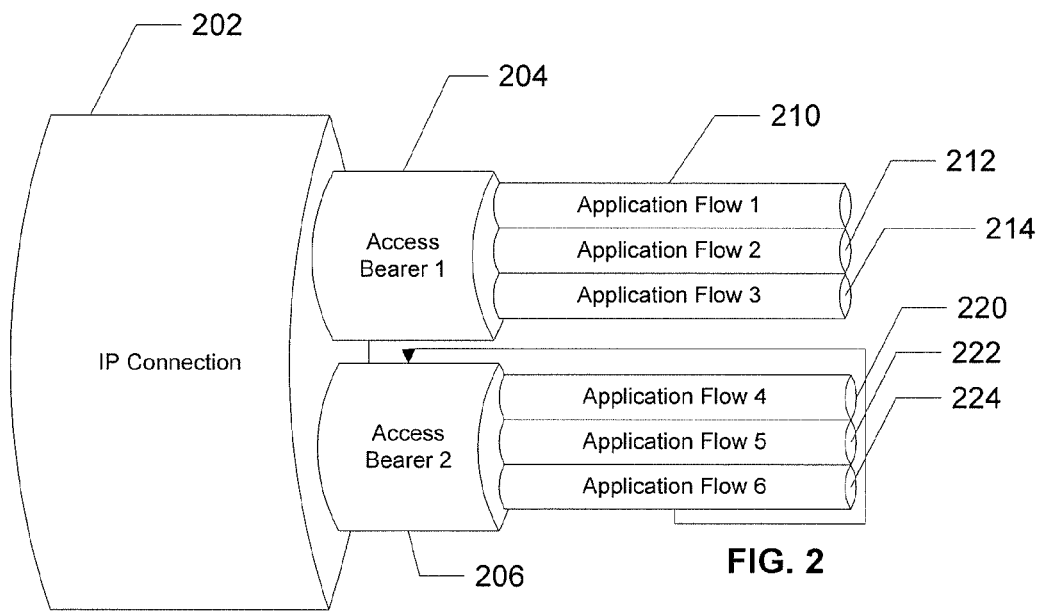
FIG. 2 is an illustration of an embodiment showing multiple application flows communicating over an access bearer.

FIG. 2 is an illustration of an embodiment showing multiple application flows communicating over an access bearer. IP connection 202 can comprise a tunnel, VPN, or the like to communicate with MS device 114 or 115. IP connection 202 can comprise an access bearer 204, 206. QoS properties of access bearer 204, 206 can be different. Access bearer 204, 206 can comprise an initial service flow. Access bearer 204 can comprise application flows 210, 212 and 215. Access bearer 206 can comprise application flows 220, 222 and 224.

Figure 3:
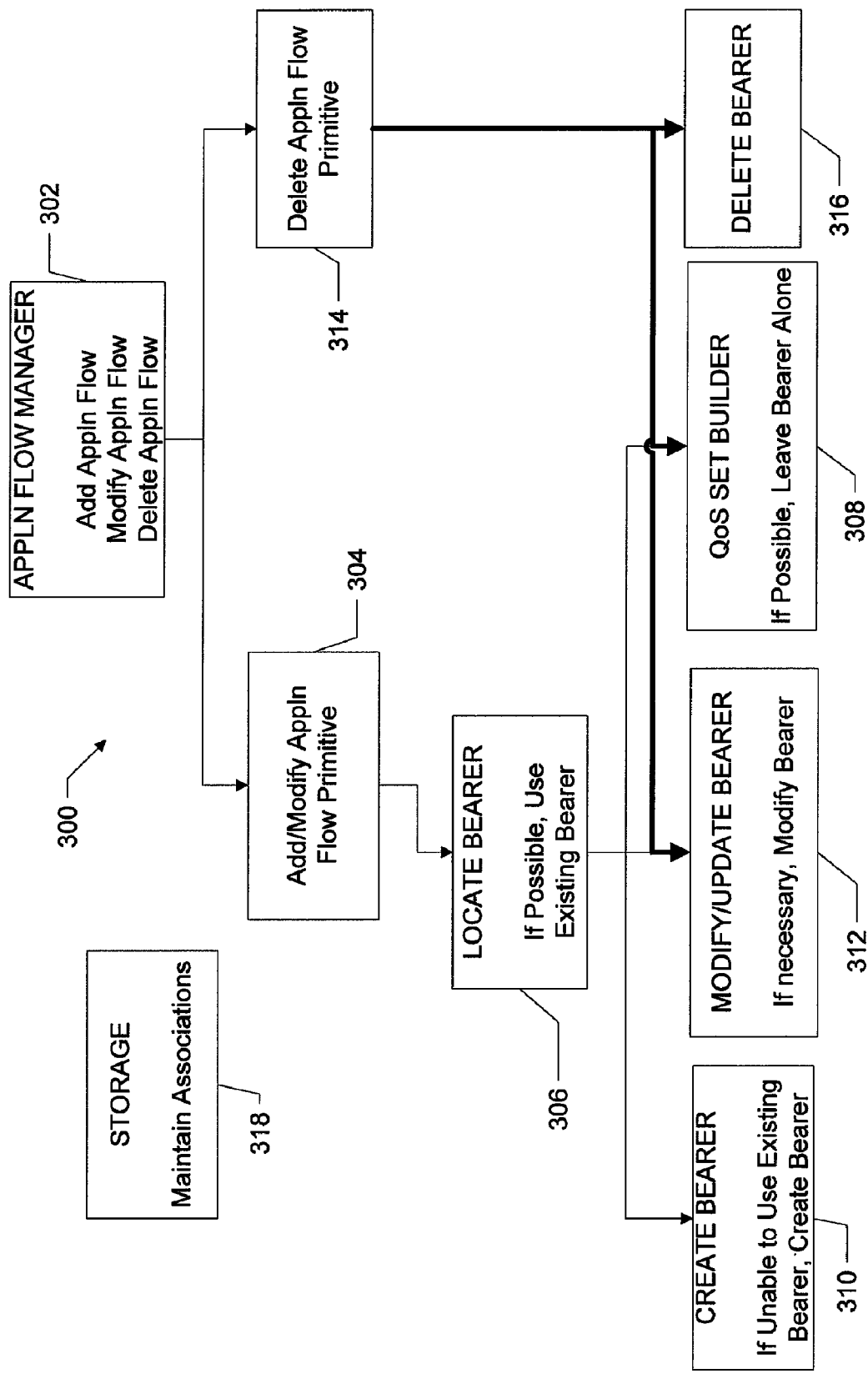
FIG. 3 is a system diagram illustrating one embodiment of flow bandwidth manager.

As illustrated in FIG. 3, a system 300 including primitives to associate and disassociate an application flow with an access bearer becomes useful. An application flow manager 302 can comprise primitives to add, modify and delete an application flow. An add/modify application flow primitive 304 can use a locate access bearer primitive 306 with a desired set of QoS properties. The QoS properties can comprise, for example, air interface scheduling algorithm, latency, and delay characteristics. Each access bearer has specific associated QoS characteristics including scheduling algorithm, latency, and jitter. In some embodiments, locate access bearer primitive 306 can require that when an application flow is associated (established) with its access bearer, it scheduling algorithm, latency, and jitter parameters must match exactly. As such, the located access bearer need not be modified by QoS set builder 308. In some embodiments, locate access bearer primitive 306 can locate an access bearer that matches the comparable QoS, but provide a better or more stringent QoS than that demanded by the desired set of QoS properties. As such, the located access bearer need not be modified by QoS set builder 308—a desired bandwidth of the located access bearer may still need to be modified to accommodate the additional application flow. In other embodiments, locate access bearer primitive 306 can locate an access bearer that with comparable QoS properties, but provide a QoS less stringent than that demanded by the desired set of QoS properties. As such, the located access bearer can be modified by using update/modify bearer primitive 312. If no current access bearer exists which matches the scheduling algorithm, latency, or jitter; a new access bearer is established by using a create bearer 312 primitive. A delete flow primitive 314 can be used to locate the access bearer associated with the application flow. In some embodiments, delete flow primitive 314 can delete the underlying access bearer using the delete bearer primitive 316. Whenever the application flow is established, altered, or cleared; the associated maximum bandwidth is adjusted.

All associations can be memorialized with storage 318. In some embodiments, the associations can be stored statically.

In some embodiments, the associations between an access bearer and an application flow can be mapped dynamically. The bearer primitives, e.g., update/modify bearer 312, create bearer 310 and delete bearer 316 can be provided by a bearer manager. In some embodiments, a portion of locate bearer primitive 306 can be provided by a bearer manager. In one embodiment, the bearer manager comprises a PCRF compliant server.

In some embodiments, the system provides for determining modifications to existing access bearer to support new application flow or modifications to existing access bearer to remove an application flow. In some embodiments, the system provides for conservation of access bearers as the ASNs support only a limited number of access bearers. When adding an application flow to an access bearer, the type of scheduling class of the access bearer can be considered. ASN providers can utilize additional considerations where the association of an application flow with an access bearer is permitted or preferred. For example an application flow needs an access bearer. One should consider the following:

If a particular scheduling class, jitter, and latency does not exist, that access bearer needs to be configured. Negotiations based on jitter and latency may occur for initial access bearer establishment. For the initial application flow, the application access table is built with a single application flow and the application flow maximum sustained rate is the maximum sustained rate of the access bearer.

An allocation table is built containing the maximum sustained rate for each application flow associated with the access bearer.

If a new application flow is requested, the application flow ID and the value of the requested maximum sustained rate is added to the table. The maximum sustained rate of the access bearer is increased by the requested maximum sustained rate.

For modification requests to an existing application flow, if an increase/decrease is requested at least a 10% increase/decrease must be made. If less than a 10% increase is requested, the new value is 110% of value when the request was made and the access bearer is adjusted accordingly. If less than a 10% decrease is requested, the request is ignored. Otherwise, the request is honored and the access bearer is adjusted accordingly.

If an application flow is torn down, the application flow ID entry of the table is deleted and the access bearer bandwidth is reduced by the application flow's maximum sustained rate. Other QoS parameters of the access bearer may also be adjusted down or made less stringent.

An access bearer cannot be deleted if it also serves as an ISF.

Figure 4:
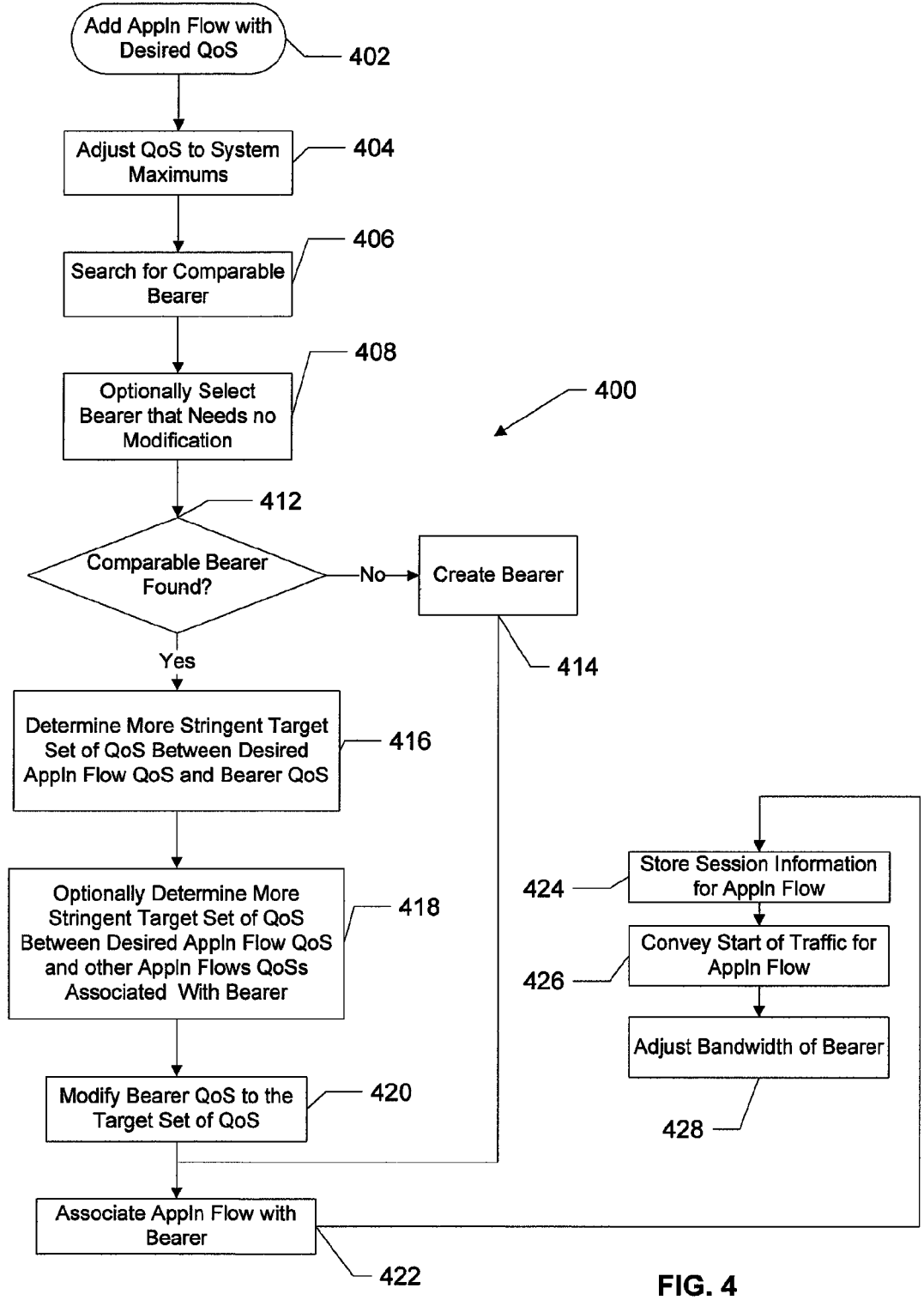
FIG. 4 is an embodiment of a method to add an application flow with a desired QoS.

FIG. 4 is an embodiment of a method 400 to add an application flow with a desired QoS 402. In step 404, method 400 can include adjusting the desired QoS properties for an application flow being added to a system maximum of QoS properties. The system maximum can be determined, for example, per RAN, per MS, per access network, per wireless standard being implemented, etc. In step 406, a search for an existing access bearer matching the desired QoS properties is performed. The search can be limited to only find access bearers that match an IP filter. In some embodiments, if more than one comparable access bearer is found, an access bearer that requires no modification is ranked greater than an access bearer that requires a modification per step 408. If no comparable access bearer has been located in step 412, an access bearer is created in step 414. If a comparable access bearer is located in step 412, the desired QoS properties are compared to the QoS properties of the access bearer per step 416. After comparing the two, a target set of QoS properties comprising the more stringent of the two properties in built per step 416. The comparison can be between the desired QoS properties and the QoS properties of the application flows already associated with the access bearer per step 418. The QoS properties of the access bearer are modified per the target QoS properties in step 420. In step 422, the application flows are associated with the created or located access bearer. Then in step 424, association information regarding the application flow and the access bearer are stored. In step 426, an indication of the start of traffic for an application flow can be conveyed. In step 428, the bandwidth of the access bearer can be adjusted to match the combined bandwidth requested by all application flows associated with the access bearer.

FIG. 5 is an embodiment of a method 500 to delete an application flow in step 502. In step 504, a search for the access bearer associated with the application flow is performed. In step 506, the application flows is disassociated from the access bearer. In step 508, a target set of QoS properties comprising the more stringent of the QoS properties for application flows still associated with the access bearer are determined. In step 510, an indication of the end of traffic for an application flow can be conveyed. Per step 512, the QoS properties of the access bearer are modified per the target QoS properties in step 508. Then in step 514, association information regarding the deleted application flow and the access bearer are removed. Also in step 514, the bandwidth of the access bearer is adjusted to match the combined bandwidth requested by all application flows associated with the access bearer. If it is determined in step 516 that the access bearer has no application flows associated, and the access bearer does not carry an ISF per step 518, the access bearer is deleted per step 520. An ISF can carry multiple best effort application flows.

FIG. 6 is an embodiment of a method 600 to modify an application flow primitive. In one embodiment, method 600 can be implemented by undertaking the steps required by undertaking a delete old application flow per step 604. The delete old application flow can be implemented per FIG. 5 in some embodiments. Then an add application flow process with the new QoS properties can be undertaken per step 606. The add new application flow 606 can be implemented per FIG. 5 in some embodiments.

The various embodiments described above are provided by way of illustration only and should not be constructed to limit the invention. Those skilled in the art will readily recognize the various modifications and changes which may be made to the present invention without strictly following the exemplary embodiments illustrated and described herein, and without departing from the true spirit and scope of the present invention, which is set forth in the following claims.

We claim:

1. A method to dynamically allocate bandwidth for a non-Internet-Protocol Multimedia Subsystem (non-IMS) application flow, the method comprising:
   receiving a request to create an application flow for an Internet Protocol (IP) filter with desired Quality of Service (QoS) properties;
   searching for an access bearer that is comparable to the desired QoS properties;
   when a comparable access bearer is not found, creating an access bearer configured to support the IP filter and the desired QoS properties; and
   associating the application flow with the access bearer.

2. The method of claim 1, further comprising:
   determining a target set of QoS properties by selecting a more stringent QoS property between a QoS property of the access bearer and a QoS property of the desired QoS properties; and
   modifying the QoS properties of the associated access bearer to match the target set of QoS properties.

3. The method of claim 2, wherein the determining the target set comprises comparing the desired QoS properties to the QoS properties of application flows previously associated with the associated access bearer.

4. The method of claim 1, further comprising:
   receiving a request to delete an application flow;
   locating the access bearer associated with the application flow; and
   disassociating the application flow from the access bearer.

5. The method of claim 4, further comprising:
   determining a target set of QoS properties by selecting a more stringent QoS property from the QoS properties of the application flows still associated with the disassociated access bearer; and
   modifying the QoS properties of the disassociated access bearer to match the target set of QoS properties.

6. The method of claim 4, further comprising conveying an indication of when traffic for the application flow ends.

7. The method of claim 4, further comprising deleting the disassociated access bearer when the disassociated access bearer has no application flows associated with it.

8. The method of claim 1, further comprising conveying an indication of when traffic for an application flow starts.

9. The method of claim 1, with the IP filter comprising a mobile station (MS) IP address.

10. The method of claim 1, with the IP filter comprising a MS IP address and a protocol id.

11. The method of claim 1, with the desired QoS properties comprising a desired bandwidth and the searching comprising locating an access bearer having a spare bandwidth.

12. The method of claim 1, with the receiving comprising receiving the request from a network side device.

13. The method of claim 1, with the IP filter comprising a MS IP address and a count of access bearers for the IP filter being less than or equal to one.

14. The method of claim 1, further comprising:
   receiving a request to amend an application flow to use amended QoS properties;
   deleting the old application flow; and
   creating an application flow with the amended QoS properties.

15. The method of claim 1, further comprising prior to said searching, adjusting the desired QoS properties to be less than or equal to a system maximum set of QoS properties.

16. The method of claim 1, with the QoS properties comprising a desired scheduling algorithm, and the searching comprising determining whether a scheduling class of the existing access bearer is less than or equal to the desired scheduling class.

17. The method of claim 1, with the QoS properties comprising a desired jitter, and the searching comprising determining whether a jitter of the existing access bearer is less than or equal to the desired jitter.

18. The method of claim 1, with the QoS properties comprising a desired latency, and the searching comprising determining whether a latency of the existing access bearer is less than or equal to the desired latency.

19. The method of claim 1, further comprising storing an association table comprising the desired QoS properties, the IP filter and the associated access bearer for an application flow.

20. The method of claim 1, with said searching comprising selecting an access bearer that need not be modified to accommodate the desired QoS properties before selecting an access bearer that needs to be modified to accommodate the desired QoS properties.

21. The method of claim 1, wherein the application flow is supported in an environment comprising an IMS network and a non-IMS compliant network.

22. The method of claim 1, further comprising recording accounting and capacity monitoring data for the application flow.

23. A flow bandwidth manager system to dynamically allocate bandwidth for a non-Internet-Protocol Multimedia Subsystem (non-IMS) application flow, the system comprising:
   a request receiver to create an application flow for an IP filter with desired QoS properties;
   a search access bearer primitive configured to select an access bearer that provides comparable QoS properties;
   a create access bearer primitive configured to create an access bearer adapted to support the IP filter and the desired QoS properties; and
   a storage to store the association between the application flow, and the found or created access bearer.

24. The system of claim 23, further comprising:
   a target QoS set builder configured to select a more stringent QoS property between a QoS property of the associated access bearer and a QoS property of the desired QoS properties; and
   an update access bearer primitive to modify the QoS properties of the associated access bearer to match the target QoS property set.

25. The system of claim 24, wherein the QoS set builder builds the target QoS property set by comparing the desired QoS properties to the QoS properties of application flows previously associated with the associated access bearer.

26. The system of claim 23, with the request receiver receiving a request to delete an application flow, and the system further comprising an application flow delete primitive to locate the access bearer associated with the application flow; and to disassociate the application flow from the access bearer.

27. The system of claim 26, further comprising:
   a target QoS set builder to select a more stringent QoS property from the QoS properties of the application flows still associated with the disassociated access bearer; and
   an update access bearer primitive to modify the QoS properties of the disassociated access bearer to match the target set of QoS properties.

28. The system of claim 23, with the IP filter comprising a MS IP address.

29. The system of claim 23, with the desired QoS properties comprising a desired bandwidth and the search access bearer primitive finding an access bearer having a spare bandwidth.

30. The system of claim 23, with the search access bearer primitive adjusting the desired QoS properties to be less than or equal to a system maximum set of QoS properties prior to the searching.

31. The system of claim 23, with the storage comprising an association table comprising the desired QoS properties, the IP filter, and the associated access bearer for each application flow.

32. The system of claim 23, with the search access bearer primitive selecting an access bearer that need not be modified to accommodate the desired QoS properties before selecting an access bearer that needs to be modified to accommodate the desired QoS properties.

33. The system of claim 23, with the application flow being supported in an environment comprising an IMS network and a non-IMS compliant network.

34. The system of claim 23, with the system being implemented in a WiMAX network.

35. The system of claim 23, further comprising a Policy Control and Charging Rules Function (PCRF) for managing access bearers.

36. A non-transitory computer readable medium in which software is recorded, wherein the software is configured to implement a method to dynamically allocate bandwidth for a non-IMS application flow, the method comprising:
   receiving a request to create an application flow for an IP filter with desired QoS properties;
   searching for an access bearer that is comparable to the desired QoS properties;
   when a comparable access bearer is not found, creating an access bearer configured to support the IP filter and the desired QoS properties; and
   associating the application flow with the found access bearer or the created access bearer.

37. A method to add a new application flow from a flow bandwidth manager to a Policy Control and Charging Rules Function (PCRF) comprising:
   searching for an access bearer that supports an IP filter and desired QoS properties;
   when there is an existing access bearer, mapping the new application flow to the existing access bearer and modifying the properties of the existing access bearer to support the new application flow; and
   creating a new access bearer to support the IP filter and the desired QoS properties when there is no existing access bearer.

38. The method of claim 37, further comprising managing access bearers provided by an ASN gateway.

39. The method of claim 37, with the access bearer being implemented in a WiMAX network.

* * * * *